United States Patent
Chow et al.

(10) Patent No.: US 12,210,980 B2
(45) Date of Patent: Jan. 28, 2025

(54) AUTOMATED PROGRAM ACCESS CONFIGURATION BASED ON INTERACTION AND TIMING DATA

(71) Applicant: Capital One Services, LLC, McLean, VA (US)

(72) Inventors: Chih-Hsiang Chow, McLean, VA (US); Steven Dang, McLean, VA (US); Elizabeth Furlan, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 980 days.

(21) Appl. No.: 17/212,921

(22) Filed: Mar. 25, 2021

(65) Prior Publication Data
US 2022/0309361 A1 Sep. 29, 2022

(51) Int. Cl.
| | | |
|---|---|---|
| *G06N 5/04* | (2023.01) | |
| *G06F 16/951* | (2019.01) | |
| *G06N 20/00* | (2019.01) | |
| *G06Q 10/1053* | (2023.01) | |
| *G06Q 10/1057* | (2023.01) | |

(52) U.S. Cl.
CPC .............. *G06N 5/04* (2013.01); *G06F 16/951* (2019.01); *G06N 20/00* (2019.01); *G06Q 10/1053* (2013.01); *G06Q 10/1057* (2013.01)

(58) Field of Classification Search
CPC ........ G06N 5/04; G06N 20/00; G06F 16/951; G06Q 10/1053; G06Q 10/1057
See application file for complete search history.

(56) References Cited

U.S. PATENT DOCUMENTS

| | | | | |
|---|---|---|---|---|
| 2005/0125259 | A1* | 6/2005 | Annappindi | G06Q 40/08 705/38 |
| 2007/0244777 | A1* | 10/2007 | Torre | G06Q 40/00 705/35 |
| 2012/0046973 | A1* | 2/2012 | Eshleman | G06Q 99/00 705/500 |
| 2013/0054447 | A1* | 2/2013 | Ross | G06Q 50/01 705/38 |
| 2016/0148318 | A1* | 5/2016 | Moynihan | G06Q 40/08 705/4 |
| 2016/0267231 | A1* | 9/2016 | Gunjan | G06Q 40/08 |
| 2017/0017914 | A1* | 1/2017 | Gupta | G06Q 10/1053 |
| 2019/0378011 | A1* | 12/2019 | Iwakura | G06N 3/084 |
| 2020/0402108 | A1* | 12/2020 | Stoddart | G06Q 10/06316 |

* cited by examiner

*Primary Examiner* — Daniel Samwel
(74) *Attorney, Agent, or Firm* — FOLEY & LARDNER LLP

(57) ABSTRACT

In certain embodiments, access to a plurality of sites associated with a plurality of users may be obtained. The plurality of sites may comprise categories of the plurality of users and interactions among the plurality of users. Based on the plurality of sites, a plurality of interaction datasets and a plurality of timing datasets may be generated. The plurality of interaction datasets and the plurality of timing datasets may be provided as inputs to a machine learning model and the machine learning model may be configured based on the inputs. Subsequent to the configuration, an interaction dataset and a timing dataset associated with a user may be provided to the machine learning model. A predicted length of time for the user may be obtained via the machine learning model and one or more settings of a program may be configured to the user based on the predicted length of time.

20 Claims, 7 Drawing Sheets

AUTOMATED PROGRAM ACCESS CONFIGURATION BASED ON INTERACTION AND TIMING DATA

FIELD OF THE INVENTION

The invention relates to facilitating program access or configuration thereof, for example, using interaction and timing data to automatically configure access settings of a program for a user.

BACKGROUND OF THE INVENTION

Advances in computing and software technologies have made it possible to curate program access for individuals. For example, users may have various levels of access, privileges, rates, or other settings within a program. However, current technologies present users with generic options, regardless of the level of program access available to each user. This leads to user frustration, such as when a user selects a desired program feature and is later denied access to that feature. Generic options—when a subset of those options does not apply to a particular user—thereby detract from the user experience and lead to dissatisfaction with the program. These and other drawbacks exist.

SUMMARY OF THE INVENTION

Aspects of the invention relate to methods, apparatuses, or systems for facilitating program access or configuration thereof based on interaction and timing data.

In some embodiments, access to a plurality of sites associated with a plurality of users may be obtained. The plurality of sites may be crawled for data indicating categories (and timing associated with the categories) of each user and interactions among the plurality of users. In some embodiments, based on the crawling, interaction datasets and category timing datasets may be generated. For example, each interaction dataset may indicate interactions of a user with one or more other users of the plurality of users. Each category timing datasets may indicate timing of the categories of the user and whether the user is in a first (active) state or a second (inactive) state. In some embodiments, the interaction datasets may include a first interaction dataset of a first user and a second interaction dataset of a second user, and the category timing datasets may include a first category timing dataset of a first user and a second category timing dataset of a second user. The first interaction dataset and at least part of the first category timing dataset may be provided to a machine learning model to cause the machine learning model to generate a first predicted length of time for which the first user is predicted to be in the second state. A first length of time for which the user is in the second state may then be determined based on the first category timing dataset. The first length of time may be provided as reference feedback to the machine learning model to cause the machine learning model to assess the first length of time against the first predicted length of time. In some embodiments, the machine learning model may be updated based on the assessment. Subsequent to the updating of the machine learning model, for at least the second user of the plurality of users, the second interaction dataset and the second category timing dataset may be provided to the machine learning model. This may cause the machine learning model to generate a second predicted length of time for which the second user is predicted to be in the second state. Based on the second predicted length of time, one or more access settings of a program may be configured for the second user.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
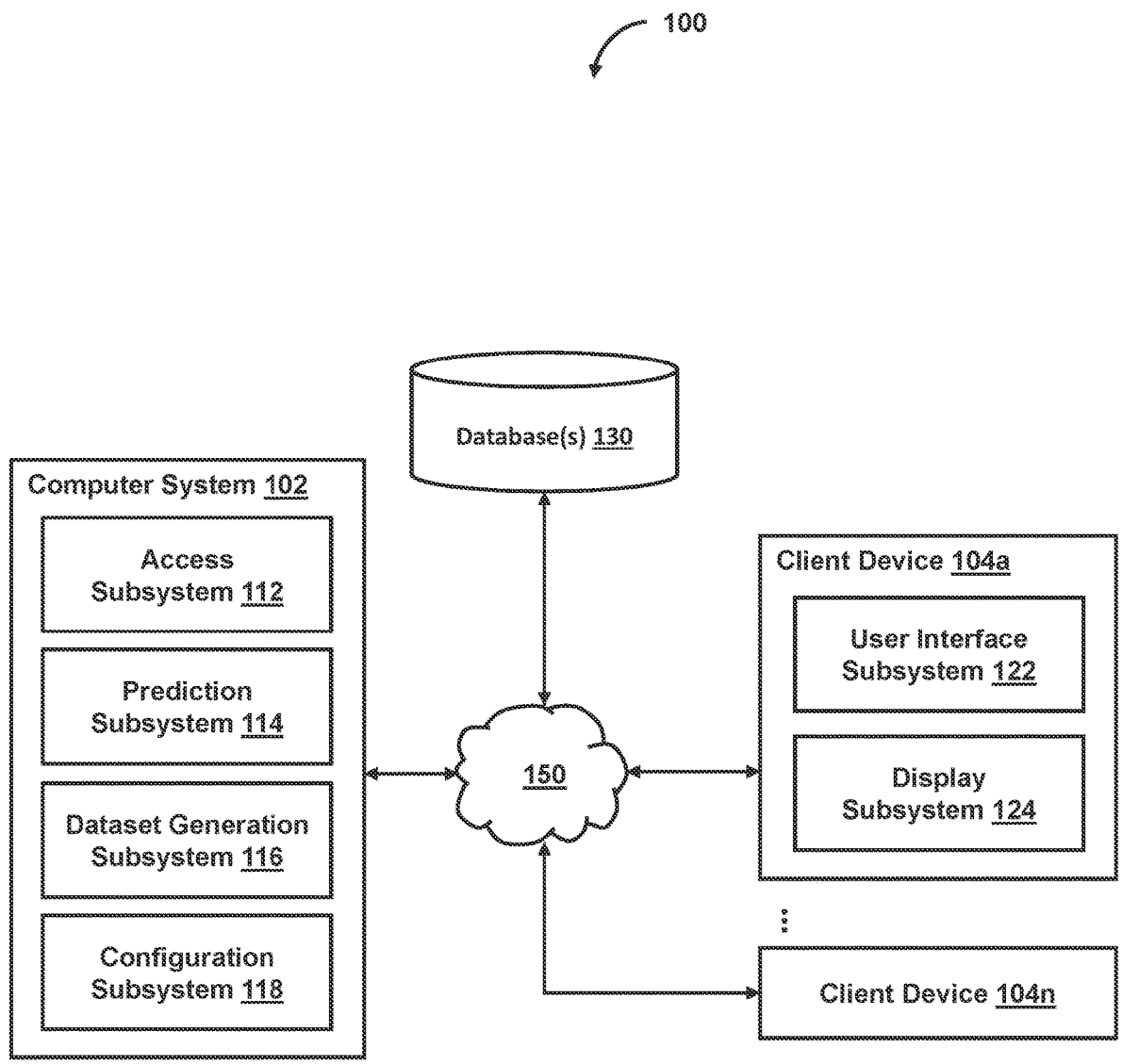
FIG. 1 shows a system for facilitating program access or configuration thereof, in accordance with one or more embodiments.

FIG. 1 shows a system 100 for facilitating program access or configuration thereof, in accordance with one or more embodiments. As shown in FIG. 1, system 100 may include computer system 102, client device(s) 104 (or client devices 104a-104n), or other components. Computer system 102 may include access subsystem 112, prediction subsystem 114, dataset generation subsystem 116, configuration subsystem 118, or other components. Each client device 104 may include user interface subsystem 122, display subsystem 124, or other components. Each client device 104 may include any type of mobile terminal, fixed terminal, or other device. By way of example, client device(s) 104 may include a desktop computer, a notebook computer, a tablet computer, a smartphone, a wearable device (e.g., augmented reality glasses or goggles), or another client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device(s) 104.

Figure 2A:
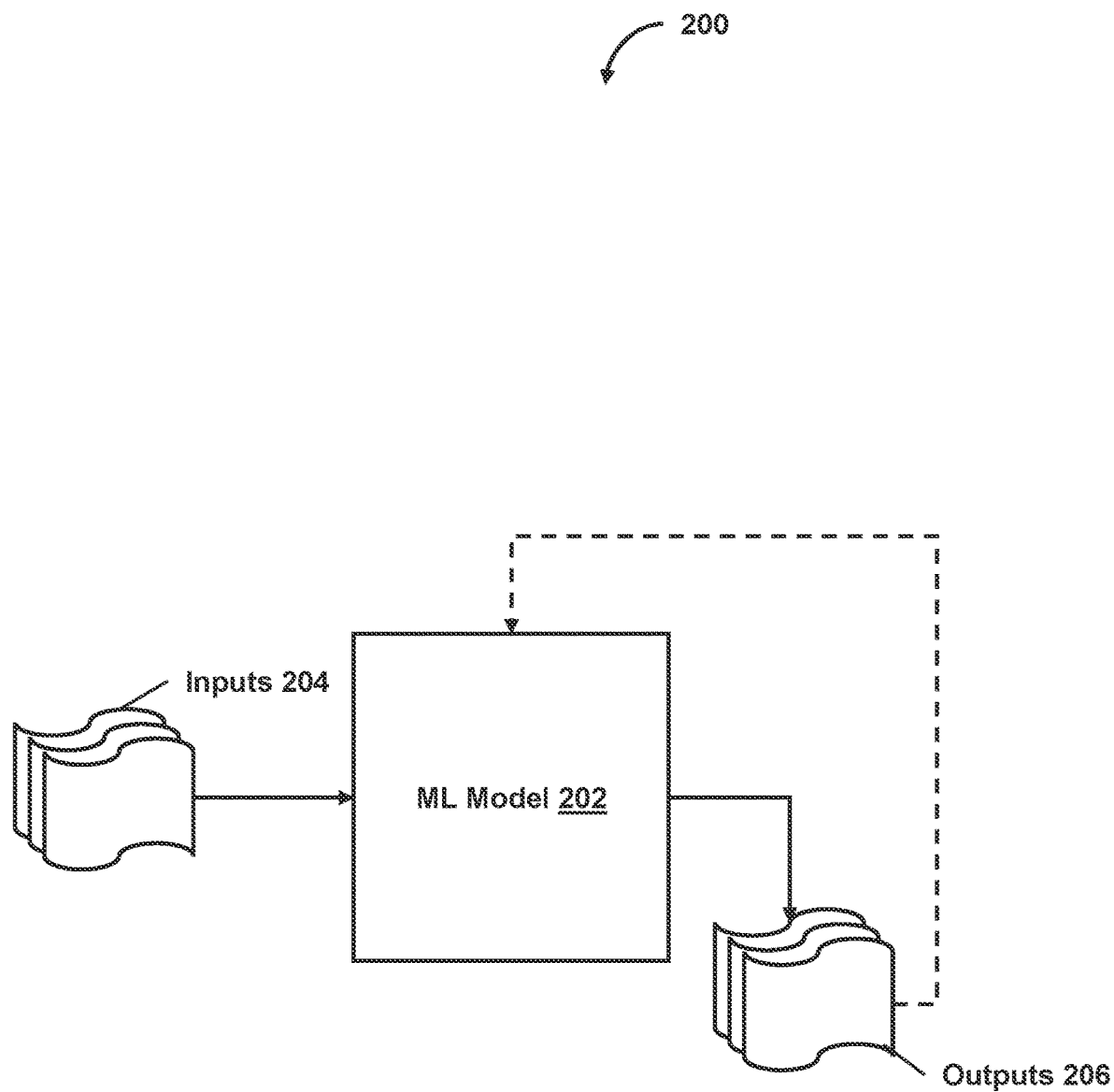
FIG. 2A shows a machine learning model configured to facilitate program access or configuration thereof, in accordance with one or more embodiments.
Figure 2B:
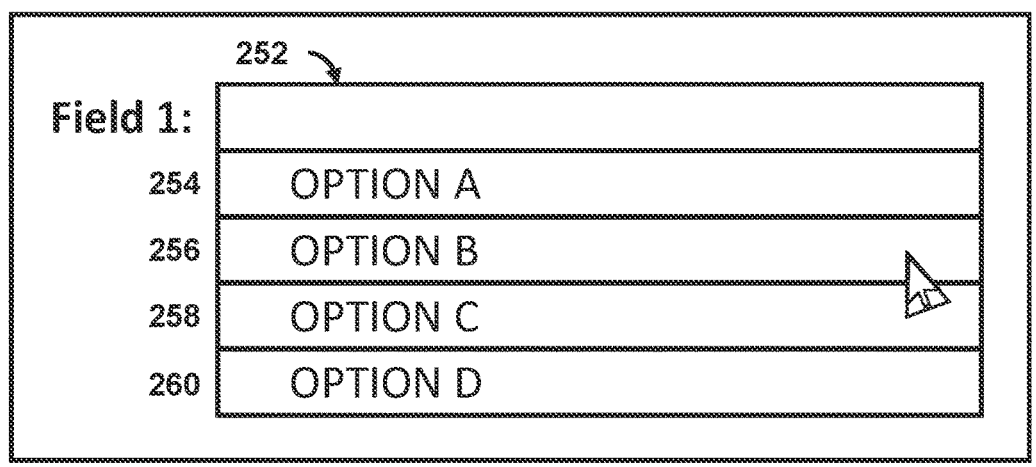
FIGS. 2B and 2C show drop down menus with selectable options, in accordance with one or more embodiments.
Figure 2C:
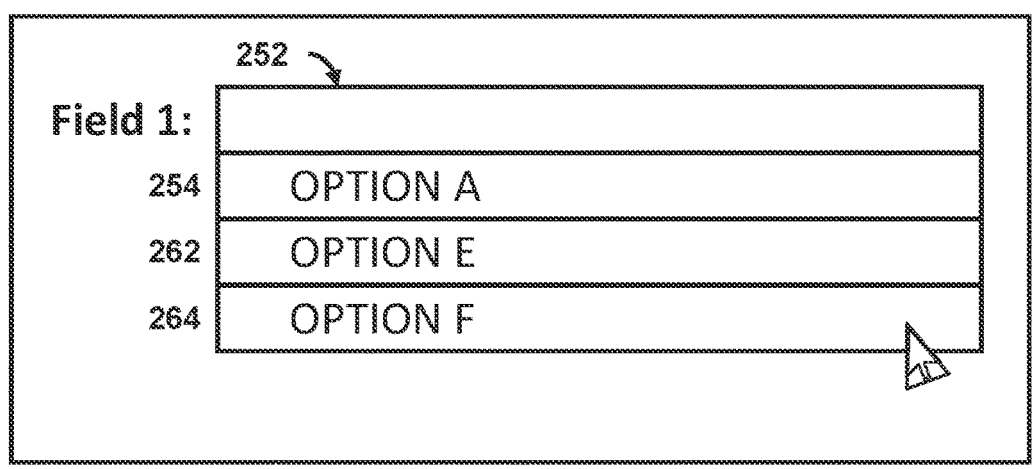

In some embodiments, system 100 may facilitate program access for a user. For example, a user may request access to a particular program. In some embodiments, access may comprise certain features of a website, app, or other program. In some embodiments, access may include certain options, rates, or information that are available to certain users. For example, FIGS. 2B and 2C show a drop down menu 252 with selectable options, in accordance with one or more embodiments. In some embodiments, a program field may be associated with drop down menu 252 populated with a number of options (e.g., A through H). However, each option may only be presented to users who meet certain criteria associated with the option. For example, certain selectable options (e.g., option A 254, option B 256, option C 258, and option D 260) may be presented to a first user while other selectable options (e.g., option A 254, option E 262, and option F 264) are presented to a second user. In some embodiments, access may comprise other forms of program access, such as binary access (e.g., acceptance or rejection), access to particular pages of a site for each user, or other forms of access.

In some embodiments, computer system 102 (e.g., access subsystem 112) may request access to information or sites associated with the user. For example, access subsystem 112 may request access to user profiles or blogs, social media sites (e.g., LinkedIn, Facebook, Instagram, etc.), financial sites (e.g., credit card accounts), or other sites. In some embodiments, access subsystem 112 may incentivize the user to provide the system with access to such information. For example, access subsystem 112 may incentivize the user by offering better program access, privileges, rates, settings, or other offers associated with the program if the user is granted access in exchange for access to information or sites associated with the user. In some embodiments, access subsystem 112 may obtain access to a plurality of sites associated with a plurality of users including the user.

In some embodiments, computer system 102 (e.g., access subsystem 112) may crawl the plurality of sites for data associated with the users. Access subsystem 112 may include a search engine crawler, such as a software application that systematically browses Internet sites in automated fashion to update the search engine's index or database of web content. For example, a search engine crawler may download a copy of a web page process the web page to update its search index. In some embodiments, access subsystem 112 may crawl HTML content of web pages or sites associated with the plurality of users.

In some embodiments, access subsystem 112 may crawl the sites for data indicating interactions among the plurality of users. For example, interactions may include a social media connection (e.g., friends, following, connected, linked, or another connection), social media interactions (e.g., messaging, posting, endorsements, or other interactions), references to each other (e.g., mentions, listings (e.g., as emergency contact), or other references), entities in common (e.g., friends, colleagues, companies, categories, or other entities), or other forms of connections. As used herein, a "connection" may be used to indicate any other user with whom a user interacts.

Figure 3A:
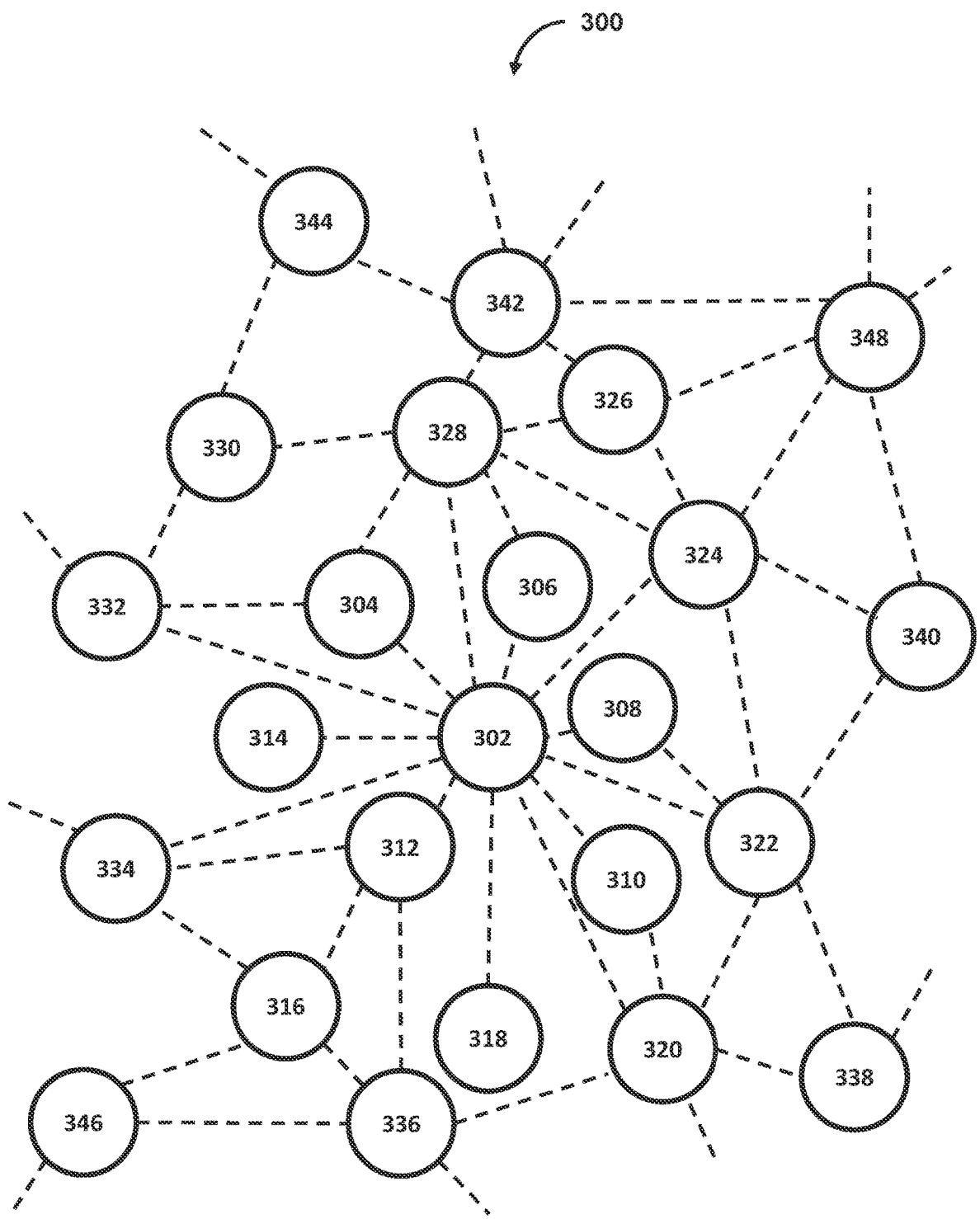
FIGS. 3A and 3B shows a plurality of interactions, in accordance with one or more embodiments.

FIG. 3A shows a plurality of interactions 300, in accordance with one or more embodiments. As shown in FIG. 3A, each user (e.g., user 302, user 304, etc.) may have one or more interactions with other users of the plurality of users. In some embodiments, interaction may be represented by the dashed lines (e.g., connecting user 302 with user 304). In some embodiments, the length of the dashed line may indicate the strength or quantity of the interactions between two users. For example, a shorter dashed line may indicate that two users interact more frequently while a longer dashed line may indicate that two users interact less frequently. Two users connected directly with a single dashed line may interact directly whereas two users connected indirectly (e.g., via another user), such as user 302 and user 348, may have indirect interactions. For example, user 302 and user 348 may know of each other based on their common interactions with user 324, but user 302 and user 348 may not interact directly. Users may have a first-degree connection (e.g., user 302 and user 324), a second-degree connection (e.g., user 302 and user 348), or a higher degree connection.

In some embodiments, access subsystem 112 may additionally crawl the plurality of sites of the plurality of users for data indicating categories of each user. In some embodiments, categories of each user may include past and present roles, functions, privileges, titles, or other categories associated with the users. For example, a category may be a role that a user plays within a program, a position held at a company, a type of privilege/responsibility a user holds in a certain domain, or another type of category. In some embodiments, each category may include associated timing information (e.g., start and end times, start and end dates, etc.). Access subsystem 112 may crawl the plurality of sites for categories and category timing information associated with the plurality of users.

Figure 4A:
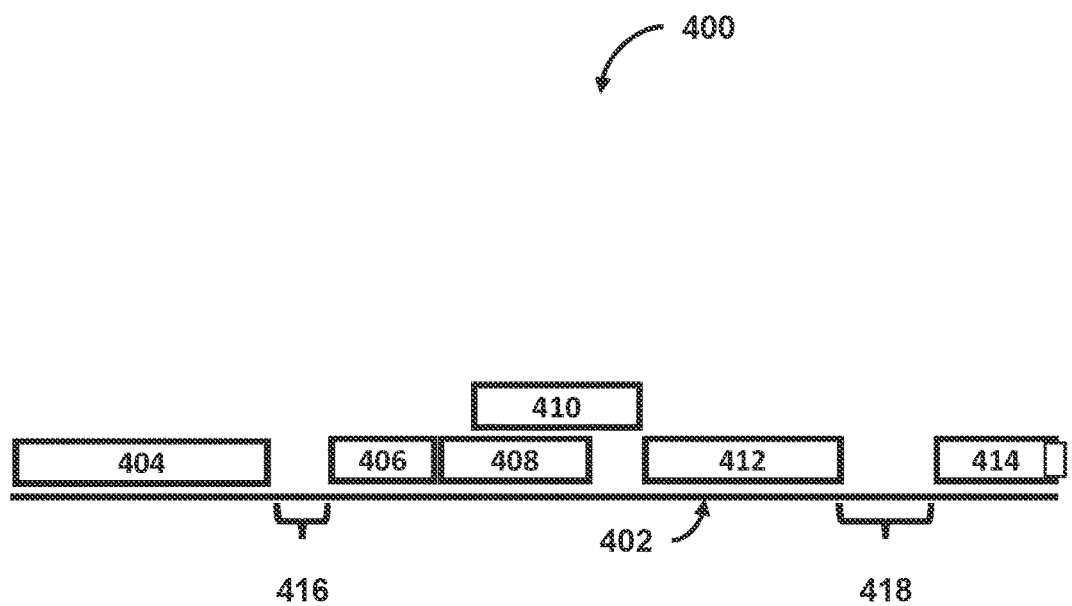
FIGS. 4A and 4B shows a plurality of categories, in accordance with one or more embodiments.
Figure 4B:
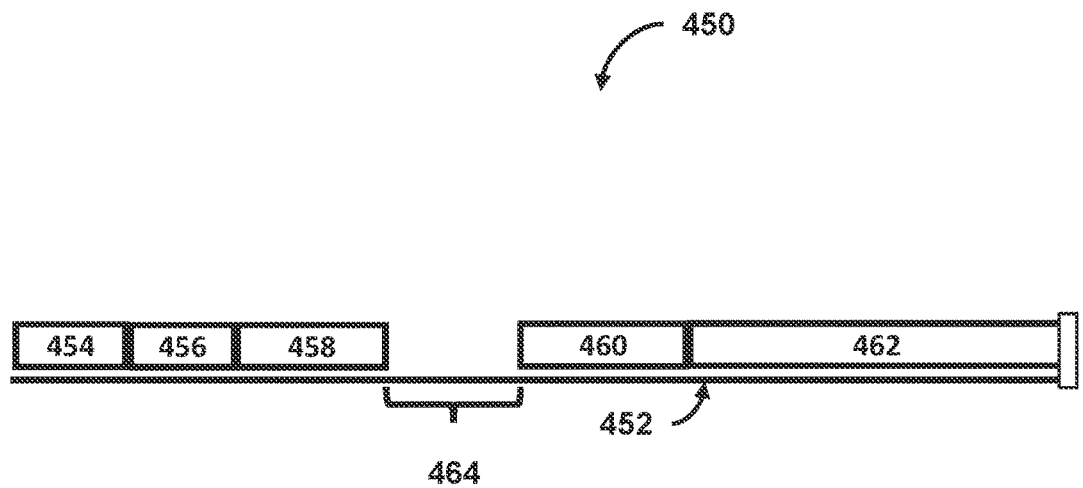

As an example, FIGS. 4A and 4B show a plurality of categories 400 and a plurality of categories 450, in accordance with one or more embodiments. In some embodiments, the plurality of categories 400 and the plurality of categories 450 may be associated with a particular user of the plurality of users (e.g., user 302). The plurality of categories 400 and the plurality of categories 450 may include past and previous categories and may be organized according to a timeline (e.g., timeline 402 and timeline 452). In some embodiments, the categories may be organized on the timelines according to the timing information (e.g., as described above). Timeline 402 and timeline 452 may indicate timing information regarding when the various categories have been associated with the user. For example, category 404, category 406, category 408, category 410, and category 412 may be previous categories associated with a first user. In some embodiments, category 414 may be a category presently associated with the first user. Category 454, category 456, category 458, and category 460 may be previous categories associated with a second user. In some embodiments, category 462 may be a category presently associated with the second user.

In some embodiments, when the user is associated with a category (e.g., portions of timeline 402 or timeline 452 having a category), the user may be in a first state, or an active state. In some embodiments, timeline 402 and timeline 452 may include time periods in which no category was associated with the user. For example, time period 416 and time period 418 may be periods of time during which no category was associated with the first user. Time period 464 may be a period of time during which no category was associated with the second user. Time period 416, time period 418, and time period 464 may indicate that the user was in a second state, or an inactive state.

In one example, the categories may be job categories of the users. For example, each site may indicate past and present jobs held by each user. Access subsystem 112 may therefore crawl the sites for job related information. Each job may be associated with a start and end date (e.g., as shown by the categories in FIGS. 4A and 4B), a total tenure with a particular company, related users (e.g., supervisors, employees, colleagues, etc.), job description and roles, or other details. Additionally, each job may be associated with a company. Access subsystem 112 may crawl sites for the companies that are associated with the jobs, as well as additional information relating to the company. For example, the company may list unoccupied categories (e.g., available jobs) over time along with details of the open positions (e.g., role, salary, requirements, or other details). The plurality of sites may further indicate how various connections are related. For example, the plurality of sites may indicate that multiple users used to work together, currently work together, or have worked at the same company (e.g., at different times). The plurality of sites may indicate whether various users work in similar roles (e.g., as engineers) or work in related fields (e.g., construction manager and civil engineer). In some embodiments, access subsystem 112 may identify other similarities between users, such as having studied the same major, studied at the same university, worked in the same field, worked in similar roles, or had other similarities. Access subsystem 112 may crawl the plurality of sites associated with the users and companies for these and other details.

In some embodiments, the crawling may include gathering historic data. For example, access subsystem 112 may crawl the plurality of sites using an application programming interface (API) in order to gather historic interaction data and historic category data. For example, access subsystem 112 may gather data indicating who a user interacted with (e.g., via connection, messages, posts, etc.) at earlier points in time and how those interactions have changed over time. In some embodiments, access subsystem 112 may gather data indicating what categories were associated with a user's connections at earlier points in time. Additionally, access subsystem 112 may gather data indicating unoccupied categories associated with a user's connections at earlier points in time (e.g., job openings at companies where a user's colleagues, friends, or acquaintances worked while the user was unemployed). The access subsystem 112 may gather historic data for the plurality of users as well as for users with whom they interact.

Based on the crawling of the plurality of sites, computer system 102 (e.g., dataset generation subsystem 116) may generate interaction datasets. For example, each interaction dataset may indicate other users with whom a user interacts. Each interaction dataset may represent a network of other users with whom a user interacts or is connected. For example, interactions may include past and present connections between users, a history of the connections between users, messaging data between users, posting data between the users, other connections that users have in common, or other interactions between users.

In some embodiments, the interaction datasets may include rankings, categories, or other organization of the other users with whom a user interacts. For example, the interaction datasets may distinguish between users having a first-degree connection and users having a second-degree connection, third-degree connection, or a more distant connection. The interaction datasets may distinguish between users who are connected and interact frequently versus users who are connected but do not interact frequently or at all. For example, the interaction datasets may include a ranking of other users with whom each user interacts. The ranking may depend on frequency and type of interaction between users. In some embodiments, the interaction datasets may include categories of other users with whom a user is connected. For example, the interaction datasets may categorize connections with whom a user interacts frequently as "close connections." Connections with whom a user interacts periodically may be categorized as "moderate connections." Connections with whom a user rarely or never interacts may be categorized as "distant connections." Any other method of ranking, categorizing, or grouping interactions in the interaction datasets may be performed.

Figure 3B:
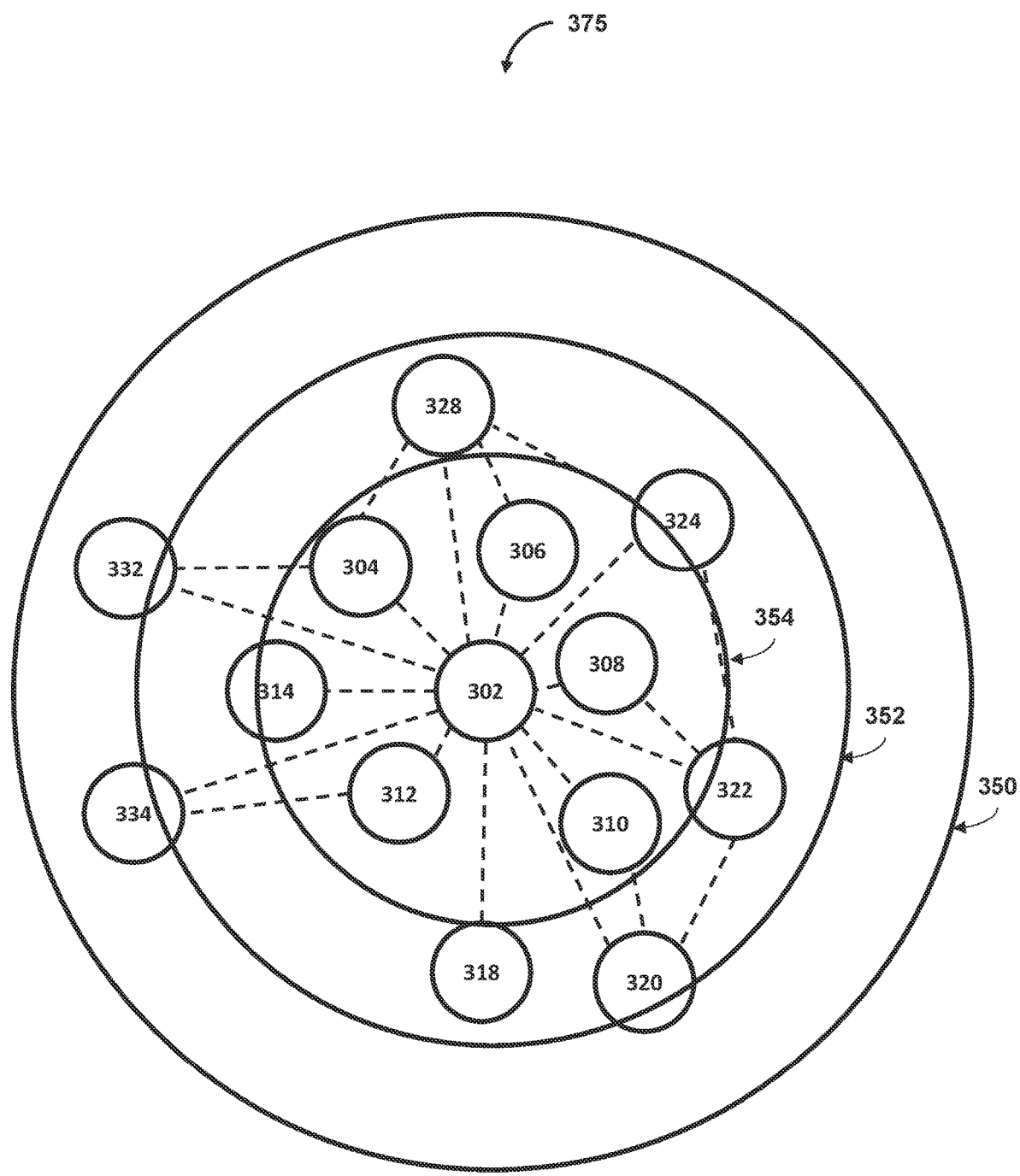

FIG. 3B shows a plurality of interactions 375, in accordance with one or more embodiments. In some embodiments, the plurality of interactions 375 may be a subset of the plurality of interactions 300, as shown in FIG. 3A. The plurality of interactions 375 show direct interactions of user 302 with a plurality of other users. As shown in FIG. 3B, certain interactions (e.g., with user 308, user 306, and user 312) are closer. As described previously, this may indicate that user 302 interacts most frequently with these users (e.g., via messages, postings, endorsements, or other interactions). On the other hand, certain interactions (e.g., with user 332 and user 334) are more distant. In some embodiments, this may indicate that, while user 302 is connected with user 332 and user 334 directly (e.g., via a social media link), user 302 does not interact frequently or at all with user 332 or user 334. In some embodiments, one or more users in FIG. 3B may interact directly with user 302 (e.g., via messaging) in the absence of a social media connection or link.

As shown in FIG. 3B, computer system 102 (e.g., dataset generation subsystem 116) may rank or group the other users with whom user 302 is connected based on interaction between the users. For example, dataset generation subsystem 116 may determine a first group 354 of "close connections" that have at least a certain level of interactions with user 302. For example, connections in the first group 354 may be connections with whom user 302 messages every day, has messaged at least twenty times, messages more than five times a month, posts about at least once every two weeks, has endorsed at least five times, any other threshold of interaction, or any combination thereof. For example, the first group 354 may include user 304, user 306, user 308, user 310, user 312, and user 314. Dataset generation subsystem 116 may determine a second group 352 of "moderate connections" that have at least a certain level of interactions with user 302 but not as many interactions with user 302 as connections in the first group 354. For example, connections in the second group 352 may be connections with whom user 302 messages on average once a week, has messaged between two and nineteen times, messages on average two to four times per month, posts approximately every two to four weeks, has endorsed two to four times, any other range of interaction, or any combination thereof. For example, the second group 352 may include user 318, user 320, user 322, user 324, and user 328. Dataset generation subsystem 116 may determine a third group 350 of "distant connections" that have minimal interactions with user 302. For example, connections in the third group 350 may be connections with whom user 302 has messaged once or never, messages fewer than once per month, posts fewer than once a month, has endorsed once or never, any other range of interaction, or any combination thereof. For example, the third group 350 may include user 332 and user 334.

In some embodiments, users who fall within the first group 354, the second group 352, or the third group 350 may be considered to be in the network of user 302. In some embodiments, the network of user 302 may instead include only users falling within the first group 354 or the second group 352. In some embodiments, any other grouping of users may constitute the network of user 302. The network of user 302 may comprise individuals who are likely to refer user 302 for an unoccupied category (e.g., job opening). In some embodiments, users falling within the network may be examined by a machine learning model (e.g., as discussed in detail below). Certain users whose distance from user 302 exceeds a certain distance may fall outside the third group. For example, user 344, user 342, user 348, user 326, user 330, user 340, user 338, user 336, user 316, and user 346 may fall outside of the user's network (e.g., due to their distance from user 302, their indirect connection with user 302, or some other factor). Any other method of grouping or ranking may be used, and any number of groups may be formed. In some embodiments, computer system 102 (e.g., dataset generation subsystem 116) may generate interaction datasets that include an interaction dataset associated with each user of the plurality of users. For example, dataset generation subsystem 116 may generate a first interaction dataset associated with a first user and a second interaction dataset associated with a second user, and so on.

Based on the crawling of the plurality of sites, computer system 102 (e.g., dataset generation subsystem 116) may generate category timing datasets. Each category timing dataset may include categories associated with each user of the plurality of users. In some embodiments, the categories may include timing information, and dataset generation subsystem 116 may incorporate the timing information in the category timing datasets. As shown in FIGS. 4A and 4B, the categories are organized according to a timeline. The category timing datasets may likewise be organized according to a timeline or the category timing datasets may be organized according to type of category, length of association between category and user, rank of category (e.g., according to salary, title, prestige, responsibility, privileges, or another metric), or another characteristics of the categories.

In some embodiments, the category timing datasets may distinguish between a first state of a user and a second state of the user. In some embodiments, the first state may be one in which the user is active while the second state may be one in which the user is inactive. In some embodiments, the first state may be one in which a category is associated with the user and the second state may be one in which no category is associated with the user. In some embodiments, the first state may be one in which the user is employed while the second state may be one in which the user is unemployed. As shown in FIGS. 4A and 4B, time periods during timeline 402 and timeline 452 in which one or more categories were associated with the user may represent the user being in the first state. For example, time periods occupied by category 404, category 404 and category 410, category 460 etc. may represent the user being in the first state. On the other hand, time period 416, time period 418, and time period 464 may represent periods in which the user is inactive, not associated with a category, unemployed, in the second state, or any combination thereof. In some embodiments, dataset generation subsystem 116 may generate category timing datasets that include a category timing dataset associated with each user of the plurality of users. For example, dataset generation subsystem 116 may generate a first category timing dataset associated with a first user and a second category timing dataset associated with a second user.

In some embodiments, computer system 102 (e.g., prediction subsystem 114) may include a machine learning model or algorithm. In some embodiments, prediction subsystem 114 may input the interaction datasets and the category timing datasets into a machine learning model. FIG. 2A shows a machine learning model 200 configured to facilitate program access or configuration thereof, in accordance with one or more embodiments. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, the prediction model may update its configurations (for example, weights, biases, or other parameters) based on its assessment of the predictions. Database 130 (e.g., as shown in FIG. 1) may include training data and one or more trained prediction models.

As an example, with respect to FIG. 2A, machine learning model 202 may take inputs 204 and provide outputs 206. For example, in some embodiments, inputs 204 may comprise full or partial interaction datasets, full or partial category timing datasets, or other datasets. For example, prediction subsystem 114 may input interaction datasets that include only close connections, only close and moderate connections, only direct connections, only connection within a certain distance from the user, or some other subset of connections. In some embodiments, prediction subsystem 114 may truncate an interaction dataset associated with a user in order to exclude other users for whom their distance from the user exceeds a threshold.

In some embodiments, inputs 204 may additionally or alternatively include unoccupied categories (e.g., job openings) associated with users' past or present connections. In some embodiments, inputs 204 may include additional information relating to the interaction datasets or the category timing datasets. For example, inputs may include additional details about each category (e.g., title, role, responsibilities, privileges, tenure, salary, or other details). In some embodiments, inputs may include additional details about entities associated with each category (e.g., company, open positions with the company, type of open positions with the company, salary associated with open positions at the company, security information associated with the company, or other details). In some embodiments, inputs 204 may include additional factors relevant to the user. For example, inputs 204 may include the user's skillset, how in-demand the user's job is in their industry, if the user's skillset is outdated, how a new job's salary would compare to the user's current salary, how many similar applicants are currently looking for jobs similar to the user's job, whether the user's connections have similar jobs to the user (e.g., such that they would be able to provide a strong referral), length of hiring process associated with job openings, how closely a user's skillset and experience aligned with requirements for job openings, or other details. In some embodiments, outputs 206 may comprise predictions of lengths of time. For example, the predictions may comprise predicted lengths of time for which a user would be in the second, inactive state (e.g., if the user were to lose their job). In some embodiments, outputs 206 may comprise predicted percent chances that a user would return to the first, active state (e.g., gain a new job) within certain time periods. For example, outputs 206 may include a percent chance that the user gets a new job within one month, two months, three months, and so on, of becoming unemployed.

In one use case, outputs 206 may be fed back (for example, active feedback) to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, other types of models may be used to generate predictions. For example, prediction subsystem 114 may include an unsupervised machine learning model. An unsupervised machine learning model may take as inputs the interaction datasets and the category timing datasets for a plurality of users. The unsupervised machine learning model may assign each dataset to a respective location in a multi-dimensional vector space. In some embodiments, the unsupervised machine learning model may plot the data within the datasets on a multi-dimensional graph (e.g., two-dimensional, three-dimensional, etc.). The machine learning model may plot the data according to, for example, a characteristic of a category (e.g., title , job, role, rank, tenure, salary, etc.), how long a user remained in a second state (as described above) after that category (e.g., after losing that job), unoccupied categories (e.g., job openings) associated with a user's connections, unoccupied categories (e.g., job openings) associated with a subset of the user's connections, or other characteristics. For example, as shown in FIGS. 4A and 4B, the machine learning model may plot data associated with the category immediately preceding a period in which a user entered the second state (e.g., a period of unemployment, inactivity, etc.). In this example, the machine learning model may plot information relating to category 404 and time period 416, category 412 and time period 418, and category 458 and time period 464.

In some embodiments, prediction subsystem 114 may examine the plotted data and identify clusters within the data. For example, prediction subsystem 114 may identify multiple data points clustered together in the certain areas of the graph. In some embodiments, the machine learning model may examine the plotted data to determine trends across the data. The machine learning model may examine each cluster to determine any similarities within the cluster. In some embodiments, prediction subsystem 114 may look for patterns relating to the category of the users immediately preceding the period of inactivity (e.g., unemployment). For example, prediction subsystem 114 may look at patterns of career history, tenure with a company, number of connections, type of connections, connections whose employers had job openings at the time a user was unemployed, types of jobs that were open with the user's network at the time, length of hiring process associated with job openings, salary, rank within a company, how closely a user's skillset and experience aligned with requirements for job openings, or other patterns. The machine learning model may plot various characteristics of categories of the plurality of users versus how long the users remained in the second state after the category. Prediction subsystem 114 may identify one or more patterns that emerge across the various plots and determine how important various characteristics of the interaction datasets and category timing datasets are for predicting a length of time for which a user is in the second state after a category.

In some embodiments, once the machine learning model has generated a prediction, such as a predicted length of time for which a user will remain in the second state, the machine learning model may receive reference feedback. For example, the machine learning model may receive as inputs an interaction dataset and a partial category timing dataset and may predict how long a user was in the second state based on the inputs. Once the machine learning model has output the prediction, the machine learning model may receive a length of time for which the user was in the second state (e.g., based on the remainder of the category timing dataset) as reference feedback. The machine learning model may adjust the importance (e.g., weights) of various characteristics it uses for predicting the length of time based on comparing its predicted length of time with the true length of time for which the user remained in the second state.

In some embodiments, once the machine learning model (e.g., supervised, unsupervised, or any other type of machine learning model) has been updated or configured, computer system 102 (e.g., prediction subsystem 114) may use the machine learning model to make predictions for other users. For example, prediction subsystem 114 may feed a new interaction dataset and a new category timing dataset associated with a user into a machine learning model to cause the machine learning model to generate a prediction. In some embodiments, prediction subsystem 114 may feed a subset of the new interaction dataset into the machine learning model. Prediction subsystem 114 may feed the subset of the new interaction datasets into the machine learning model so that only connections that are likely to connect the user with an unoccupied category are used by the machine learning model to generate the predictions. For example, the subset may include only close connections or only close and moderate connections. In some embodiments, the subset may include connections within a certain distance. For example, the distance may be determined based on frequency of interaction, number of connections in common, number of links or jumps between the users, or some other determination. In some embodiments, prediction subsystem 114 may additionally feed a set of unoccupied categories (e.g., job openings) associated with the user's connections into the machine learning model. For example, prediction subsystem 114 may additionally feed a set of unoccupied categories (e.g., job openings) associated with users included in the interaction dataset or the subset of the interaction dataset into the machine learning model.

The unsupervised machine learning model may compare various aspects of the interaction dataset and category timing dataset with the plotted data to identify a cluster into which the datasets associated with the user fall. In some embodiments, the user's data may place the user in a cluster with other users having job histories, job skills, numbers of connections, numbers of unoccupied categories in the user's network, or other characteristics (e.g., such as those described previously) in common with the user. For example, the datasets may place the user into a first cluster. Other users in the first cluster may have found a new job after two weeks of unemployment. This may cause the unsupervised machine learning model to predict that the user would find a new job approximately two weeks after losing their current job. In another example, the datasets may place the user in a second cluster. Other users in the second cluster may have found a new job after 3 months of unemployment. This may cause the unsupervised machine learning model to predict that the user would find a new job approximately three months after losing their current job. The machine learning model may thus predict a length of time that it will take a user to find employment after losing a job. In some embodiments, the machine learning model may make other predictions based on the cluster within which the user's data falls. The machine learning model may output, for example, the percent chance the user will return to the first state within various time periods (e.g., within one month, within two months, etc.). For example, the machine learning model may predict that the user has a 50% chance of finding a job within one month, an 85% chance of finding a job within two months, and so on.

In some embodiments, the machine learning model may predict a salary range, rank, title, or other aspect of the user's next job after a period of unemployment. For example, the machine learning model may identify, based on a cluster to which the user is similar, a salary range of jobs obtained by other users in the cluster after a period of unemployment. The machine learning model may predict a salary or salary range for the user's subsequent job if the user were to lose their current job (e.g., based on the other users in the cluster). In some embodiments, the machine learning model may identify, based on the cluster to which the user is similar, the rank or title of jobs obtained by other users in the cluster after a period of unemployment. The machine learning model may predict a rank or title for the user's subsequent job if the user were to lose their current job (e.g., based on the other users in the cluster). The machine learning model may similarly make other predictions relating to the user's subsequent job (e.g., if the user were to lose their current job) based on the clusters identified by the machine learning model.

In some embodiments, based on the predictions for the new user, computer system 102 (e.g., configuration subsystem 118) may configure one or more settings of a program for a user. For example, the one or more settings may be access settings for the user. The one or more settings may determine certain privileges, rates, security features, or other features of the program to which the user may access. In some embodiments, if the predicted length of time for the user is a certain length (e.g., it satisfies a threshold), configuration subsystem 118 may configure the settings such that the user does not have access to the program.

In some embodiments, configuration subsystem 118 may compare the predicted length of time for the user to a threshold of six months. If the predicted length of time meets or exceeds six months, the user may be rejected. In some embodiments, configuration subsystem 118 may grant the user access to the program if the predicted length of time is sufficiently low (e.g., does not satisfy the threshold). Similarly, if the predicted percent chance of returning to the first state within a time period does not exceed a threshold, configuration subsystem 118 may block access to the program for the user. For example, configuration subsystem 118 may compare the predicted percent chance for the user to a threshold of 50% within three months. If the predicted percent chance for the user is at or below the threshold, configuration subsystem 118 may reject the user. However, if configuration subsystem 118 determines that the predicted length of time or the percent chances for the user are within the required bounds, configuration subsystem 118 may configure one or more settings (e.g., access settings) such that the user is able to access the program.

In some embodiments, as shown in FIGS. 2B and 2C, certain features (e.g., options, settings, rates, or other features) of the program may be available to a certain user while other features of the program are available to another user. In some embodiments, certain programs may display (e.g., to the user) menus populated with selectable options within the program. The selectable options may be associated settings (e.g., rates, terms, etc.) or other features of the program. Configuration subsystem 118 may present each user with a subset of the total options (e.g., A through H) based on the predictions associated with the user. For example, configuration subsystem 118 may present a first user with first settings 250 and present a second user with second settings 275. For example, configuration subsystem 118 may present certain selectable options (e.g., option A 254, option B 256, option C 258, and option D 260) to the first user while presenting other selectable options (e.g., option A 254, option E 262, and option F 264) to the second user. Thus, while a user is able to select certain settings of the program, the user must pick from a subset of the settings that has been curated for the user based on the predictions generated for that user.

In some embodiments, the program may be a loan program, a credit program, a security program, a computer program, or any other program. In some embodiments, the access settings may include approval, program privileges, interest rates, rewards, or other settings. These or other settings may be based on the predicted length of time for the user or the percent chance that the user will return to the active state within a certain time period. For example, a shorter predicted length of time or a higher percent chance may cause configuration subsystem 118 to set a low interest rate for the user while a longer predicted length of time (that is nonetheless under a threshold required to gain access to the program) or a lower percent chance may cause configuration subsystem 118 to set a high interest rate for the user. In some embodiments, a shorter predicted length of time or a higher percent chance may cause configuration subsystem 118 to grant more program privileges than a longer predicted length of time or a lower percent chance. In some embodiments, a shorter predicted length of time or a higher percent chance may cause configuration subsystem 118 to grant better program rewards than a longer predicted length of time or a lower percent chance. In some embodiments, these or other settings may be based on other predictions. For example, as described above, the machine learning model may output other predictions such as predicted salary, predicted rank or title, or other predicted features of a category with which the user is predicted to be associated with upon returning to the first, active state. The approval, program privileges, interest rates, rewards, or other settings may thus be based on a predicted salary, predicted rank or title, or other predicted features.

In some embodiments, the predicted length of time or the percent chances may be fed into another machine learning model (e.g., supervised, unsupervised, or another type of machine learning model). For example, another machine learning model may be trained based on training data including data for a plurality of users who have been accepted into the program. As an example, with respect to FIG. 2A, machine learning model 202 may take inputs 204 and provide outputs 206. For example, in some embodiments, inputs 204 may comprise interaction datasets and category timing datasets for a plurality of users who use or have used the program. Inputs 204 may additionally include performance data relating to users who previously accessed the program or who currently access the program. For example, the performance data may include access history, payment history, interest history, or other performance metrics. In some embodiments, inputs 204 may include ratings associated with the users (e.g., program ratings based on the user's performance within the program, credit scores, or other ratings). In some embodiments, inputs 204 may include predicted lengths of time associated with the plurality of users (e.g., as generated by the first machine learning model described above).

Once the second machine learning model is configured, prediction subsystem 114 may use the machine learning model for additional predictions. For example, the outputs of the first machine learning model discussed above (i.e., the predicted length of time for which a user will be in the second state or the predicted percent chances associated with the user) may be fed into the second machine learning model as inputs. The second machine learning model may predict, based on the length of time, a risk associated with the user. For example, the second machine learning model may compare the user with the other users included in the training data. Based on similarities or based on a cluster within which the user falls, the second machine learning model may identify a risk associated with the user. For example, the second machine learning model may identify other users with whom the user shares similarities and may consult the performance histories of the other users in the training data. Based on these performance histories, the machine learning model may predict how the user will perform within the program. For example, the second machine learning model may predict a credit risk, underwriting risk, insurance risk, security risk, or another type of risk. In some embodiments, a longer predicted length of time or a lower percent chance of returning to the active state within a certain time period may cause the second machine learning model to predict that there is a higher risk associated with the user whereas a shorter predicted length of time or a higher percent chance of returning to the active state within a certain time period may cause the second machine learning model to predict that there is little to no risk associated with the user. Prediction subsystem 114 may use a single machine learning model or multiple machine learning models to make several predictions. In some embodiments, prediction subsystem 114 may use several machine learning models of the same type or different types. In some embodiments, as described above, the outputs of one machine learning model may feed into another machine learning model as inputs (e.g., as described above), such that the machine learning models are layered.

Figure 5:
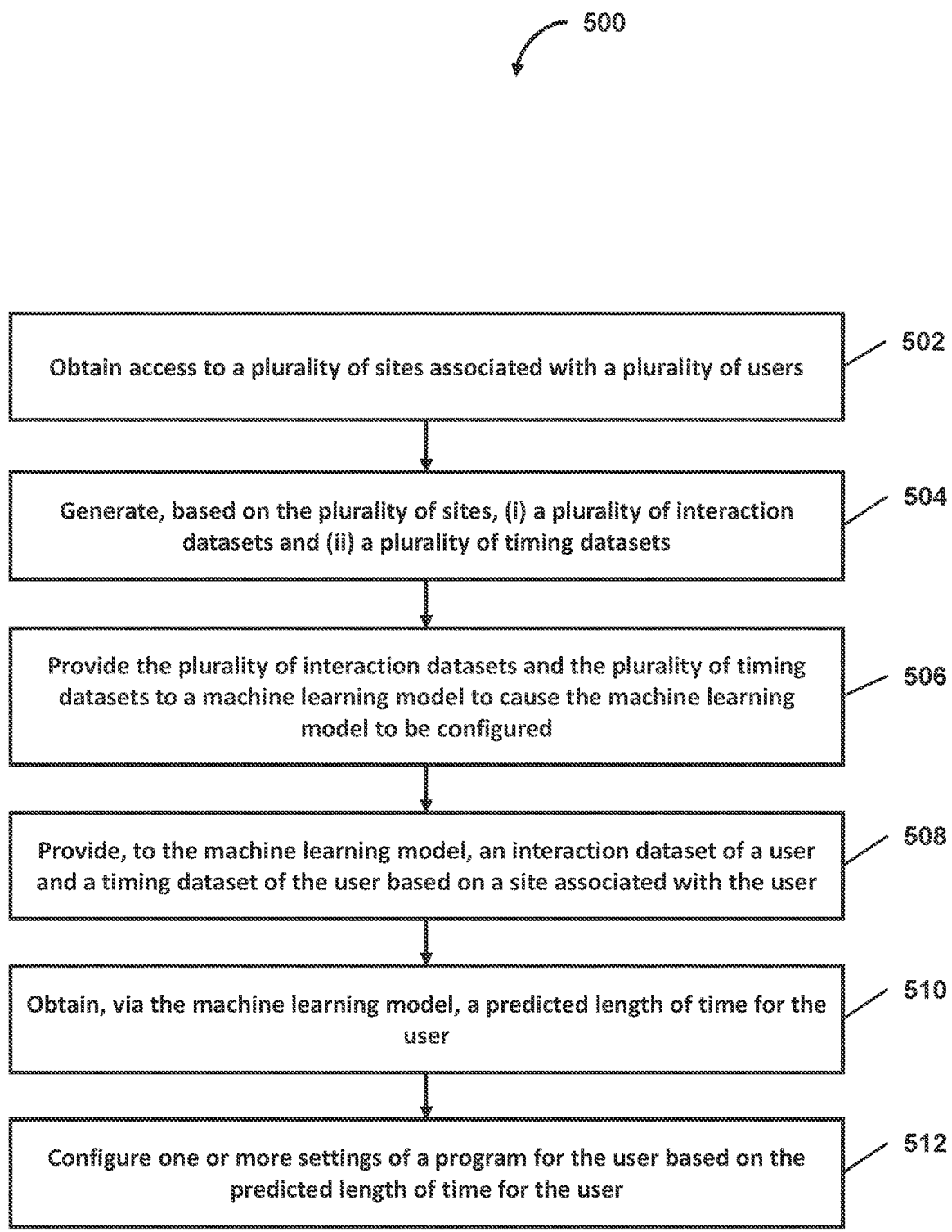
FIG. 5 shows a flowchart of a method of facilitating program access or configuration thereof, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart 500 of a method of facilitating program access or configuration thereof, in accordance with one or more embodiments. In an operation 502, access to a plurality of sites associated with a plurality of users may be obtained. In some embodiments, access to the plurality of sites may be obtained by requesting access from a user, incentivizing a user to provide access, or by other means. In some embodiments, the plurality of sites may be crawled for information relating to the user (e.g., categories of each user and interactions among the users). In some embodiments, the plurality of sites may be crawled using an application programming interface (API) in order to gather historic interaction data and historic category data (e.g., connections, messages, posts, etc.) at earlier points in time and how those interactions have changed over time. Operation 502 may be performed by a subsystem that is the same as or similar to access subsystem 112, in accordance with one or more embodiments.

In an operation 504, based on the plurality of sites, a plurality of interaction datasets and a plurality of timing datasets may be generated. For example, the interaction datasets may indicate interactions or connections between users over time, a strength or distance of connection, how many connections users have in common, and other interaction details. The timing datasets may indicate a timing of the categories of the user. For example, the timing datasets may include a timeline of past and present categories that have been associated with the user, as well as inactive periods of the timeline during which no category was associated with the user. Operation 504 may be performed by a subsystem that is the same as or similar to dataset generation subsystem 116, in accordance with one or more embodiments.

In an operation 506, the plurality of interaction datasets and the plurality of timing datasets may be provided to a machine learning model to cause the machine learning model to be configured. For example, the machine learning model may be a supervised or unsupervised model. In some embodiments, the machine learning model may additionally take in reference feedback as inputs. For example, the machine learning model may be trained using historic data relating to interactions and categories of one or more users. Operation 506 may be performed by a subsystem that is the same as or similar to prediction subsystem 114, in accordance with one or more embodiments.

In an operation 508, an interaction dataset of a user and a timing dataset of the user based on a site associated with the user may be provided to the machine learning model. For example, the interaction dataset of a user and the timing dataset of the user may be provided to the machine learning model subsequent to configuration. In some embodiments, the machine learning model may compare the interaction data and timing data with the training data to identify one or more users with whom the user has similarities (e.g., similar timing data, similar interactions, similar unoccupied categories available, or other similarities). Operation 508 may be performed by a subsystem that is the same as or similar to prediction subsystem 114, in accordance with one or more embodiments.

In an operation 510, a predicted length of time for the user may be obtained via the machine learning model. For example, in some embodiments, the predicted length of time may be a length of time for which the user is expected to be in a certain state (e.g., an inactive state). In some embodiments, the predicted length of time may comprise percent chances that a user will return to the active state within certain time periods (e.g., 50% chance within one month, 85% chance within two months, etc.). In some embodiments, other predicts may be generated by the machine learning model. In some embodiments, the output from the machine learning model may be fed into another machine learning model (e.g., a second model that predicts risk associated with a user based on the predicted length of time). Operation 510 may be performed by a subsystem that is the same as or similar to prediction subsystem 114, in accordance with one or more embodiments.

In an operation 512, one or more settings of a program may be configured for the user based on the predicted length of time for the user. For example, the one or more settings may be access settings for the program. In some embodiments, the one or more settings may include privileges, rates, security features, rewards, or other settings. In some embodiments, the one or more settings may be depend on the predicted length of time or the percent chances predicted by the model. For example, shorter predicted lengths of time or higher percent chances may lead to better privileges, rates, security features, rewards, or other settings, while longer predicted lengths of time or lower percent chances may lead to poorer privileges, rates, security features, rewards, or other settings. In some embodiments, the Operation 512 may be performed by a subsystem that is the same as or similar to configuration subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 130 or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 120-126, and/or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and subsystems 120-126 described herein is for illustrative purposes, and is not intended to be limiting, as any of subsystems 112-118 or subsystems 120-126 may provide more or less functionality than is described. For example, one or more of subsystems 112-118 or subsystems 120-126 may be eliminated, and some or all of its functionality may be provided by other ones of subsystems 112-118 or subsystems 120-126. As another example, additional subsystems may be programmed to perform some or all of the functionality attributed herein to one of subsystems 112-118 or subsystems 120-126.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining access to a plurality of sites associated with a plurality of users, the plurality of sites comprising categories of the plurality of users and interactions among the plurality of users; generating, based on the plurality of sites, (i) a plurality of interaction datasets indicating the interactions among the plurality of users and (ii) a plurality of timing datasets indicating timing of the categories of the plurality of users; providing the plurality of interaction datasets and the plurality of timing datasets to a machine learning model, the machine learning model being configured based on the plurality of interaction datasets and the plurality of timing datasets; subsequent to the configuration of the machine learning model, providing, to the machine learning model, an interaction dataset indicating interactions of a user of the plurality of users with other users of the plurality of users and a timing dataset indicating timing of categories of the user based on a site, of the plurality of sites, associated with the user; obtaining, via the machine learning model, a predicted length of time for the user of the plurality of users; and configuring one or more settings of a program for the user based on the predicted length of time for the user.
2. The method of embodiment 1, further comprising: determining whether the predicted length of time exceeds a threshold, wherein the one or more settings of the program are configured for the user based on determining that the predicted length of time does not exceed the threshold.
3. The method of any of embodiments 1-2, wherein generating the plurality of timing datasets comprises distinguishing between a first state and a second state of the plurality of users, the first state being one in which the user is active and the second state being one in which the user is inactive.
4. The method of embodiment 3, wherein the predicted length of time is a length of time during which the user is predicted to be in the second state.
5. The method of any of embodiments 1-4, further comprising: obtaining first unoccupied categories from the plurality of sites associated with the plurality of users; and providing the first unoccupied categories to the machine learning model with the plurality of interaction datasets and the plurality of timing datasets, the machine learning model being further configured based on the first unoccupied categories.
6. The method of embodiment 5, further comprising: calculating a distance between the user and each of the other users of the plurality of users based on the interactions of the user with the other users; and truncating the interaction dataset by excluding one or more of the other users for which the distance exceeds a threshold, wherein providing the interaction dataset to the machine learning model comprises providing the truncated interaction dataset to the machine learning model.
7. The method of embodiment 6, further comprising: obtaining second unoccupied categories from other sites associated with users included in the truncated interaction dataset; and providing the second unoccupied categories to the machine learning model with the truncated interaction dataset and the timing dataset, the machine learning model being further configured based on the second unoccupied categories.
8. The method of embodiment 7, further comprising obtaining, via the machine learning model, an updated predicted length of time for the user of the plurality of users.
9. A tangible, non-transitory, machine-readable medium storing instructions that, when executed by a data processing apparatus, causes the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.

What is claimed is:
1. A system for facilitating program access via a machine learning model, the system comprising:
a computer system that comprises one or more processors programmed with computer program instructions that, when executed, cause the computer system to perform operations comprising:
obtaining access to a plurality of sites associated with a plurality of users;
crawling the plurality of sites for data indicating categories of each user of the plurality of users and interactions among the plurality of users;
generating, based on the crawling, interaction datasets and category timing datasets, wherein (i) each interaction dataset of the interaction datasets indicates for a user of the plurality of users interactions of the user with one or more other users of the plurality of users, (ii) each category timing dataset of the category timing datasets indicates a timing of the categories of the user, each category timing dataset indicating whether the user is in a first state and a second state, the interaction datasets comprising first and second interaction datasets respectively associated with first and second users of the plurality of users, the category timing datasets comprising first and second category timing datasets respectively associated with the first and second users;
obtaining a first set of unoccupied categories, comprising job openings, from other sites, of the plurality of sites, associated with one or more other users involved in interactions with the first user as indicated by the first interaction dataset;
providing the first interaction dataset, at least part of the first category timing dataset, and information regarding one or more of a title, a role, one or more responsibilities, or one or more privileges, or a tenure associated with a category of the first set of unoccupied categories to a machine learning model to cause the machine learning model to generate a first predicted length of time for which the first user is predicted to be in the second state;
determining, based on the first category timing dataset, a first length of time for which the first user is in the second state;
providing the first length of time as reference feedback to the machine learning model to cause the machine learning model to assess the first length of time against the first predicted length of time, the machine learning model being updated based on the assessment; and
subsequent to the updating of the machine learning model, for at least the second user of the plurality of users:

providing the second interaction dataset and the second category timing dataset to the machine learning model to cause the machine learning model to generate a second predicted length of time for which the second user is predicted to be in the second state; and
configuring, based on the second predicted length of time, one or more access settings of a program for the second user.

2. The system of claim 1, wherein, subsequent to the updating of the machine learning model, the operations further comprise:
obtaining data from a second site, of the plurality of sites, associated with the second user, the data indicating interactions of the second user with other users of the plurality of users;
calculating a distance between the second user and each of the other users based on the interactions of the second user with the other users of the plurality of users; and
truncating the second interaction dataset by excluding one or more of the other users for which the distance exceeds a distance threshold,
wherein providing the second interaction dataset to the machine learning model comprises providing the truncated second interaction dataset to the machine learning model.

3. The system of claim 2, wherein the operations further comprise:
obtaining a second set of unoccupied categories, comprising job openings, from other sites, of the plurality of sites, associated with one or more other users involved in interactions with the second user as indicated by the second interaction dataset,
wherein the second predicted length of time is generated based on the second interaction dataset, the second category timing dataset, and the second set of unoccupied categories.

4. The system of claim 1, wherein the operations further comprise:
providing information regarding a time period to the machine learning model to cause the machine learning model to generate a first percent chance that the first user will return to the first state within the time period, and
providing, subsequent to providing the second interaction dataset and the second category timing dataset to the machine learning model, information regarding the time period to the machine learning model to cause the machine learning model to generate a second percent chance that represents the percent chance that the second user will return to the first state within the time period; and
configuring, based on the second percent chance, one or more access settings of a program for the second user.

5. A method being implemented by one or more processors executing computer program instructions that, when executed, perform the method, the method comprising:
obtaining access to a plurality of sites associated with a plurality of users, the plurality of sites comprising categories of the plurality of users and interactions among the plurality of users;
generating, based on the plurality of sites, (i) a plurality of interaction datasets indicating the interactions among the plurality of users, (ii) a plurality of timing datasets indicating timing of the categories of the plurality of users, and (iii) first unoccupied categories comprising job openings associated with the plurality of users;
providing the plurality of interaction datasets, the plurality of timing datasets, and information regarding one or more of a title, a role, one or more responsibilities, one or more privileges, or a tenure associated with a category of the first unoccupied categories to a machine learning model, the machine learning model being configured based on the plurality of interaction datasets and the plurality of timing datasets;
subsequent to the configuration of the machine learning model, providing, to the machine learning model, an interaction dataset indicating interactions of a user of the plurality of users with other users of the plurality of users, a timing dataset indicating timing of categories of the user based on a site, of the plurality of sites, associated with the user;
obtaining, via the machine learning model, a predicted length of time for the user of the plurality of users; and
configuring one or more settings of a program for the user based on the predicted length of time for the user.

6. The method of claim 5, further comprising:
determining whether the predicted length of time exceeds a threshold,
wherein the one or more settings of the program are configured for the user based on determining that the predicted length of time does not exceed the threshold.

7. The method of claim 5, wherein generating the plurality of timing datasets comprises distinguishing between a first state and a second state of the plurality of users, the first state being one in which the user is active and the second state being one in which the user is inactive.

8. The method of claim 7, wherein the predicted length of time is a length of time during which the user is predicted to be in the second state.

9. The method of claim 7, further comprising:
providing, to the machine learning model, information regarding a time period;
obtaining, from the machine learning model, a percent chance that the user will return to the first state within the time period; and
configuring one or more settings of a program for the user based on the percent chance.

10. The method of claim 5, further comprising:
calculating a distance between the user and each of the other users of the plurality of users based on the interactions of the user with the other users; and
truncating the interaction dataset by excluding one or more of the other users for which the distance exceeds a threshold,
wherein providing the interaction dataset to the machine learning model comprises providing the truncated interaction dataset to the machine learning model.

11. The method of claim 10, further comprising:
obtaining second unoccupied categories, comprising job openings, from other sites, of the plurality of sites, associated with users included in the truncated interaction dataset; and
providing the second unoccupied categories to the machine learning model with the truncated interaction dataset and the timing dataset, the machine learning model being further configured based on the second unoccupied categories.

12. The method of claim 11, further comprising obtaining, via the machine learning model, an updated predicted length of time for the user of the plurality of users.

13. The method of claim 5, wherein the information is regarding the one or more responsibilities or the one or more privileges associated with the category.

14. One or more non-transitory, computer-readable media having instructions that, when executed by one or more processors, cause operations comprising:
- obtaining access to a plurality of sites associated with a plurality of users, the plurality of sites comprising categories of the plurality of users and interactions among the plurality of users;
- generating, based on the plurality of sites, (i) a plurality of interaction datasets indicating the interactions among the plurality of users, (ii) a plurality of timing datasets indicating timing of the categories of the plurality of users, and (iii) first unoccupied categories comprising job openings associated with the plurality of users;
- providing the plurality of interaction datasets, the plurality of timing datasets, and information regarding one or more of a title, a role, one or more responsibilities, one or more privileges, or a tenure associated with a category of the first unoccupied categories to a machine learning model, the machine learning model being configured based on the plurality of interaction datasets, the plurality of timing datasets, and the first unoccupied categories;
- subsequent to the configuration of the machine learning model, providing, to the machine learning model, an interaction dataset indicating interactions of a user of the plurality of users with other users of the plurality of users and a timing dataset indicating timing of categories of the user based on a site, of the plurality of sites, associated with the user;
- obtaining, via the machine learning model, a predicted length of time for the user of the plurality of users; and
- configuring one or more settings of a program for the user based on the predicted length of time for the user.

15. The media of claim 14, further comprising:
- determining whether the predicted length of time exceeds a threshold,
- wherein the one or more settings of the program are configured for the user based on determining that the predicted length of time does not exceed the threshold.

16. The media of claim 14, wherein generating the plurality of timing datasets comprises distinguishing between a first state and a second state of the plurality of users, the first state being one in which the user is active and the second state being one in which the user is inactive.

17. The media of claim 16, wherein the predicted length of time is a length of time during which the user is predicted to be in the second state.

18. The media of claim 14, further comprising:
- calculating a distance between the user and each of the other users of the plurality of users based on the interactions of the user with the other users; and
- truncating the interaction dataset by excluding one or more of the other users for which the distance exceeds a threshold,
  - wherein providing the interaction dataset to the machine learning model comprises providing the truncated interaction dataset to the machine learning model.

19. The media of claim 18, further comprising:
- obtaining second unoccupied categories, comprising job openings, from other sites, of the plurality of sites, associated with users included in the truncated interaction dataset; and
- providing the second unoccupied categories to the machine learning model with the truncated interaction dataset and the timing dataset, the machine learning model being further configured based on the second unoccupied categories.

20. The media of claim 19, further comprising obtaining, via the machine learning model, an updated predicted length of time for the user of the plurality of users.

* * * * *